US012711386B2

(12) United States Patent
Chen et al.

(10) Patent No.: US 12,711,386 B2
(45) Date of Patent: Aug. 18, 2026

(54) METHODS AND APPARATUS FOR HYBRID TRAINING OF NEURAL NETWORKS FOR VIDEO CODING

(71) Applicant: BEIJING DAJIA INTERNET INFORMATION TECHNOLOGY CO., LTD., Beijing (CN)

(72) Inventors: Wei Chen, San Diego, CA (US); Xiaoyu Xiu, San Diego, CA (US); Yi-Wen Chen, San Diego, CA (US); Hong-Jheng Jhu, San Diego, CA (US); Che-Wei Kuo, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 732 days.

(21) Appl. No.: 18/118,819

(22) Filed: Mar. 8, 2023

(65) Prior Publication Data

US 2023/0252300 A1 Aug. 10, 2023

Related U.S. Application Data

(63) Continuation of application No. PCT/US2022/018582, filed on Mar. 2, 2022.

(Continued)

(51) Int. Cl.
*G06V 10/82* (2022.01)
*G06N 3/045* (2023.01)

(Continued)

(52) U.S. Cl.
CPC ............ *G06N 3/084* (2013.01); *G06N 3/045* (2023.01); *G06N 3/0464* (2023.01); *G06V 10/82* (2022.01); *H04N 19/42* (2014.11)

(58) Field of Classification Search
CPC ...... G06N 3/084; G06N 3/045; G06N 3/0464; G06N 3/0495; G06N 3/082; G06N 3/09;

(Continued)

(56) References Cited

U.S. PATENT DOCUMENTS

| | | | | |
|---|---|---|---|---|
| 10,223,635 | B2 * | 3/2019 | Annapureddy ........ | G06N 3/082 |
| 10,289,962 | B2 * | 5/2019 | Vinyals .................. | G06N 20/00 |

(Continued)

FOREIGN PATENT DOCUMENTS

| | | |
|---|---|---|
| CN | 112070226 A | 12/2020 |
| CN | 112417765 A | 2/2021 |
| WO | WO 2020/192034 A1 | 10/2020 |

OTHER PUBLICATIONS

English-language Search Report issued in European Application No. 22764009.1 dated Jan. 24, 2025, (12 pages).

(Continued)

*Primary Examiner* — Beau D Spratt
(74) *Attorney, Agent, or Firm* — Crowell & Moring LLP

(57) ABSTRACT

A method and an apparatus for hybrid training of neural networks for video coding are provided. The method includes: obtaining, in an offline training stage, an offline trained network by training a first neural network offline using a plurality of first data sets; refining, in an online training stage, a plurality of neural network layers using a plurality of second data sets, wherein the plurality of neural network layers comprise at least one neural network layer in the offline trained network or in a second neural network connected to the offline trained network.

19 Claims, 14 Drawing Sheets

Related U.S. Application Data

(60) Provisional application No. 63/156,350, filed on Mar. 3, 2021.

(51) Int. Cl.
*G06N 3/0464* (2023.01)
*G06N 3/084* (2023.01)
*H04N 19/42* (2014.01)

(58) Field of Classification Search
CPC .......... G06N 3/08; G06V 10/82; H04N 19/42; H04N 19/107
See application file for complete search history.

(56) References Cited

U.S. PATENT DOCUMENTS 10,945,695 B2 * 3/2021 Zhou ...................... G06N 3/045
2019/0050735 A1 * 2/2019 Ji ......................... G06N 3/0464
2019/0188568 A1 6/2019 Keskar et al.
2019/0273948 A1 * 9/2019 Yin ...................... H04N 19/172
2020/0143206 A1 * 5/2020 Kartal .................... G06N 3/047
2020/0218932 A1 * 7/2020 Hensman ............... G06N 20/00
2020/0252654 A1 * 8/2020 Su ........................ H04N 19/176
2020/0265153 A1 8/2020 Li et al.
2020/0265273 A1 * 8/2020 Wei ........................ G06V 10/70
2021/0019555 A1 * 1/2021 Kalchbrenner ......... G06F 18/21
2021/0158156 A1 * 5/2021 Shamir .................. G06N 3/045
2022/0007015 A1 1/2022 Ma et al.
2022/0246233 A1 * 8/2022 Morrone .................. G06N 3/09

OTHER PUBLICATIONS

Robinson et al.; "Learning Fast and Robust Target Models for Video Object Segmentation", Arxiv.org, Cornell University Library, Feb. 27, 2020, (12 pages).

Jia et al.; "Content-Aware Convolutional Neural Network for In-Loop Filtering in High Efficiency Video Coding", IEEE Transactions on Image Processing, IEEE, Jul. 2019, pp. 3343-3356, vol. 28, No. 7, (14 pages).

Office action issued in Japanese application No. 2023-553445, dated Oct. 15, 2024, 14 pages (with English translation).

Wang et al., "EE-1.6 Neural network based in-loop filtering," Joint Video Experts Team (JVET) of ITU-T SG 16 WP 3 and ISO/IEC JTC 1/80 29, Jan. 2021, 6 pages International Search Report issued Jun. 22, 2022 in corresponding International PCT Application No. PCT/CN2020/018582.

* cited by examiner

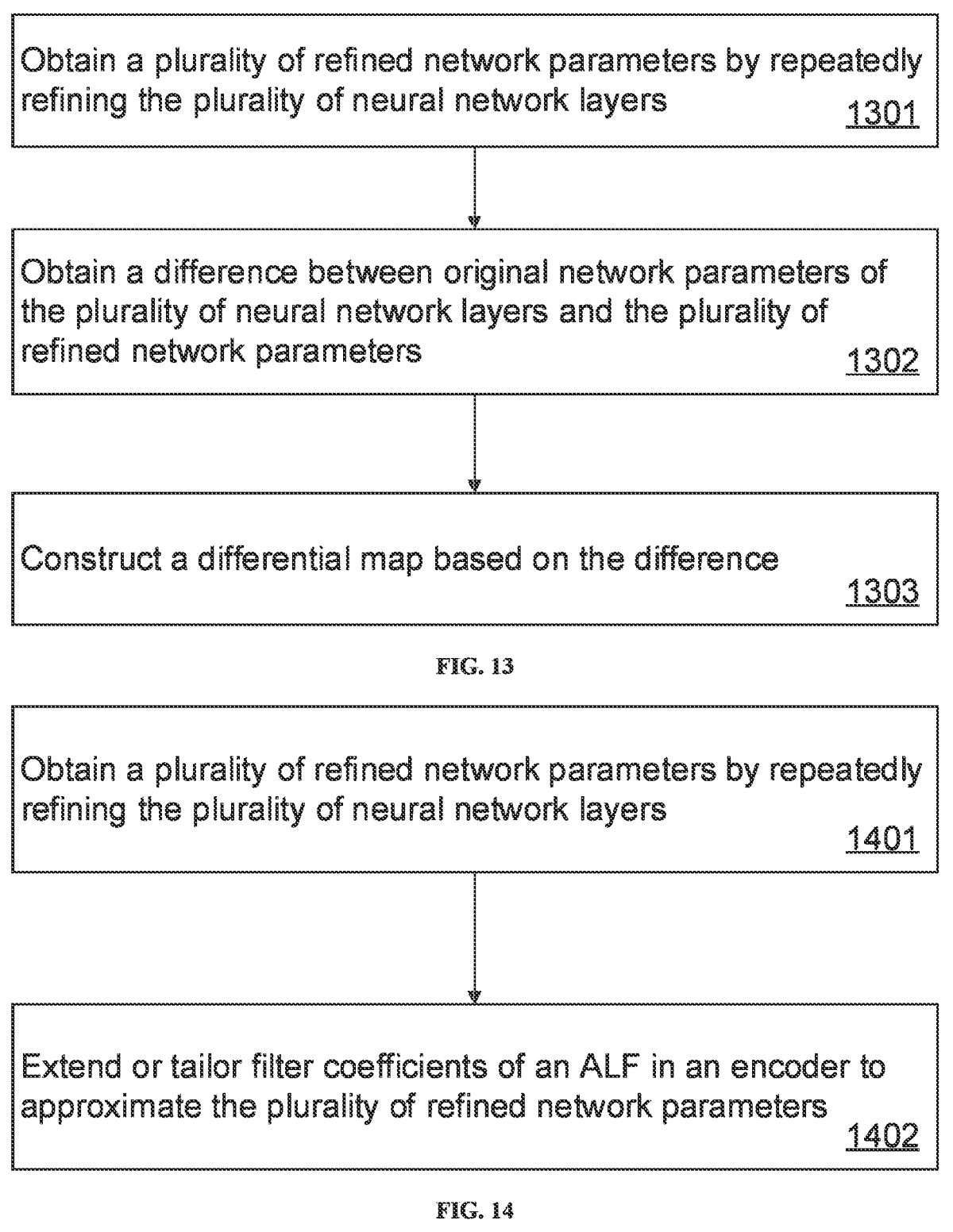

Obtain a plurality of refined network parameters by repeatedly refining the plurality of neural network layers 1301

Obtain a difference between original network parameters of the plurality of neural network layers and the plurality of refined network parameters 1302

Construct a differential map based on the difference 1303

FIG. 13

Obtain a plurality of refined network parameters by repeatedly refining the plurality of neural network layers 1401

Extend or tailor filter coefficients of an ALF in an encoder to approximate the plurality of refined network parameters 1402

FIG. 14

METHODS AND APPARATUS FOR HYBRID TRAINING OF NEURAL NETWORKS FOR VIDEO CODING

CROSS-REFERENCE TO RELATED APPLICATION

This application is a continuation application of PCT Patent Application No. PCT/US2022/018582, filed on Mar. 2, 2022, which claims priority to U.S. Provisional Application No. 63/156,350, entitled "Methods and Apparatus for Hybrid Training of Neural Networks for Video Coding," filed on Mar. 3, 2021, wherein the content of the above-referenced applications is incorporated herein by reference in its entirety.

FIELD

The present disclosure relates to video coding, and in particular but not limited to, methods and apparatus for hybrid training of neural networks for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (WET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY

The present disclosure provides examples of techniques relating to improving video coding efficiency using a hybrid training on neural networks for video coding.

According to a first aspect of the present disclosure, there is provided a method for hybrid training of neural networks for video coding. The method includes: obtaining, in an offline training stage, an offline trained network by training a first neural network offline using a plurality of first data sets; and refining, in an online training stage, a plurality of neural network layers using a plurality of second data sets, where the plurality of neural network layers may include at least one neural network layer in the offline trained network or in a second neural network connected to the offline trained network.

According to a second aspect of the present disclosure, there is provided an apparatus for hybrid training of neural networks for video coding. The apparatus includes one or more processors and a memory configured to store instructions executable by the one or more processors. Further, the one or more processors, upon execution of the instructions, are configured to perform the method according to the first aspect.

According to a third aspect of the present disclosure, there is provided a non-transitory computer-readable storage medium storing computer-executable instructions that, when executed by one or more computer processors, causing the one or more computer processors to perform the method according to the first aspect.

According to a fourth aspect of the present disclosure, there is provided a video coding method. The method includes: receiving, at the decoder, a bitstream including the encoded video information and online trained parameters, and obtaining the decoded video information by decoding with the bitstream, wherein the online trained parameters in the bitstream are generated through the method according to the first aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 13 is a flowchart illustrating a process for hybrid training on neural networks for video coding in accordance with some implementations of the present disclosure.

FIG. 14 is a flowchart illustrating a process for hybrid training on neural networks for video coding in accordance with some implementations of the present disclosure.

DETAILED DESCRIPTION

Figure 1:
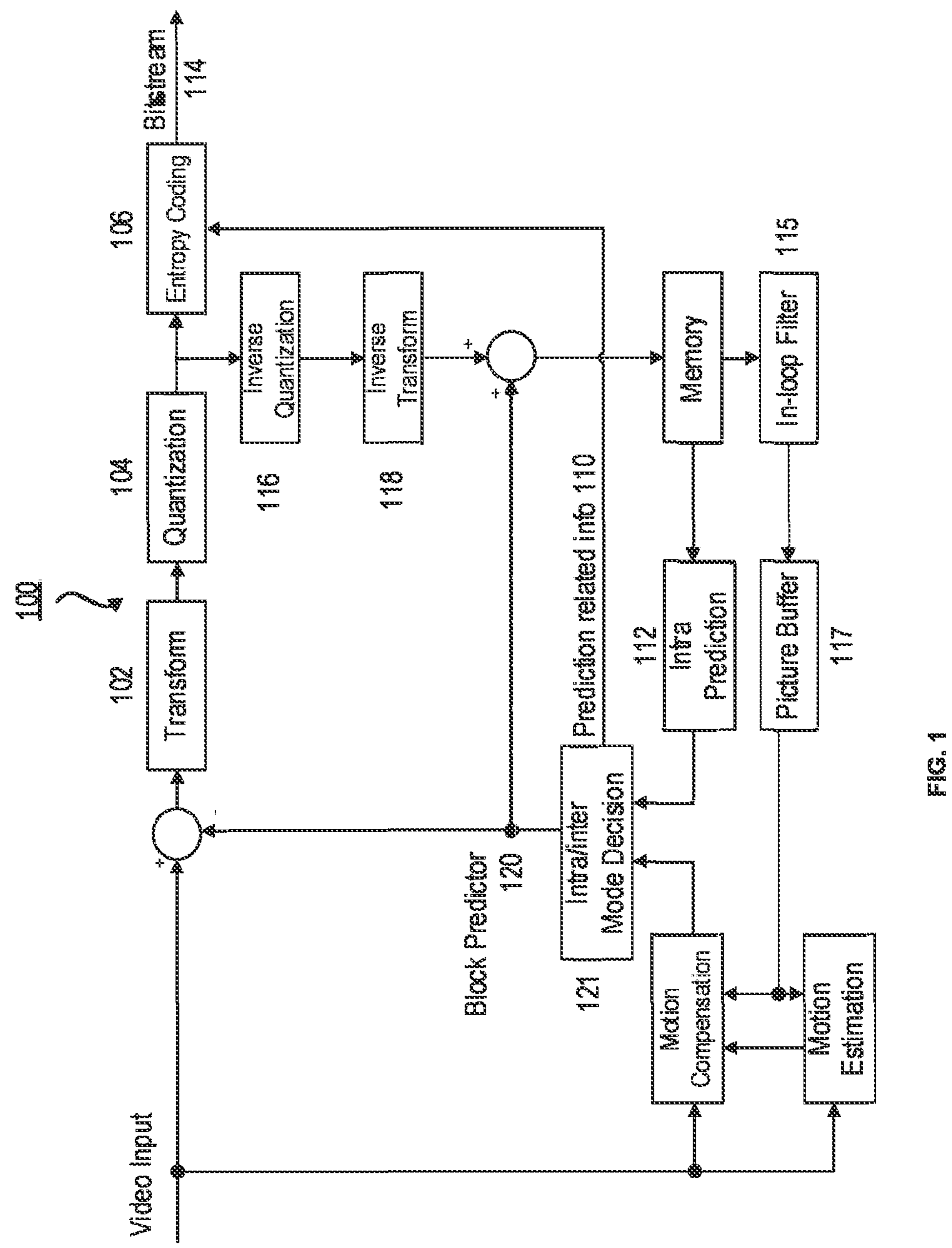
FIG. 1 is a block diagram illustrating a block-based video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C, 3D, 3E:
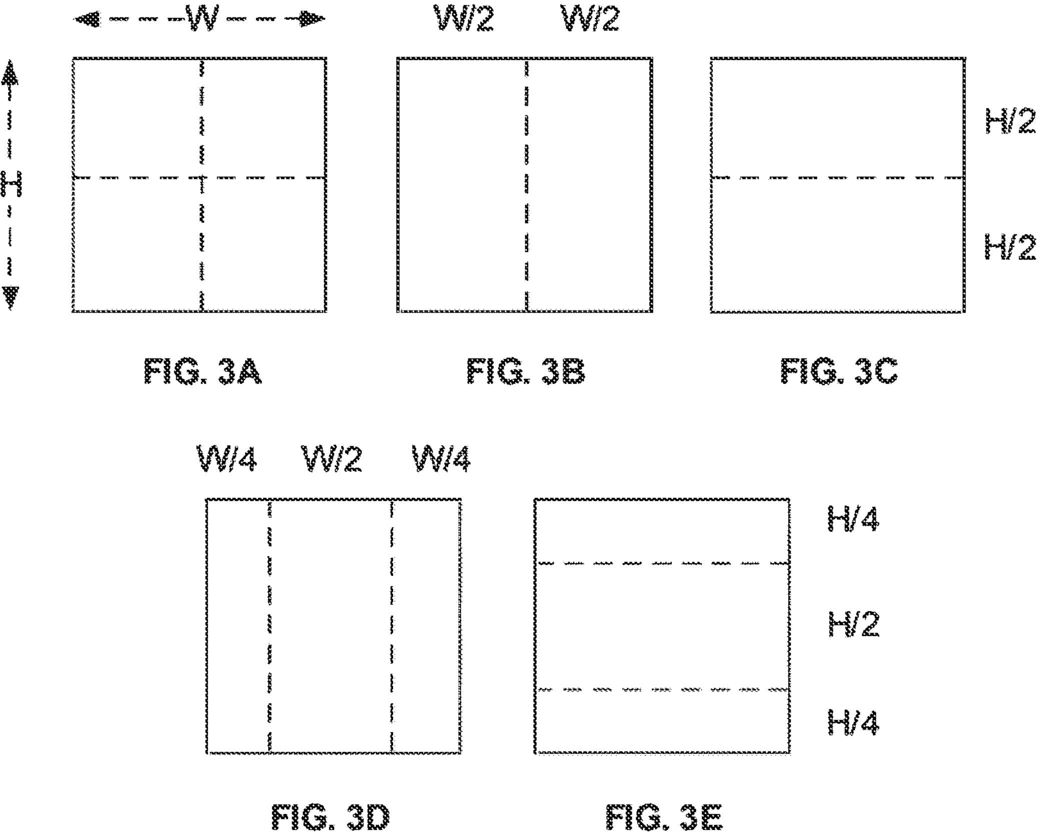
FIG. 3A is schematic diagram illustrating quaternary partitioning tree splitting mode in accordance with some implementations of the present disclosure.
FIG. 3B is schematic diagram illustrating vertical binary partitioning tree splitting mode in accordance with some implementations of the present disclosure.
FIG. 3C is schematic diagram illustrating horizontal binary partitioning tree splitting mode in accordance with some implementations of the present disclosure.
FIG. 3D is schematic diagram illustrating vertical ternary partitioning tree splitting mode in accordance with some implementations of the present disclosure.
FIG. 3E is schematic diagram illustrating horizontal ternary partitioning tree splitting mode in accordance with some implementations of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
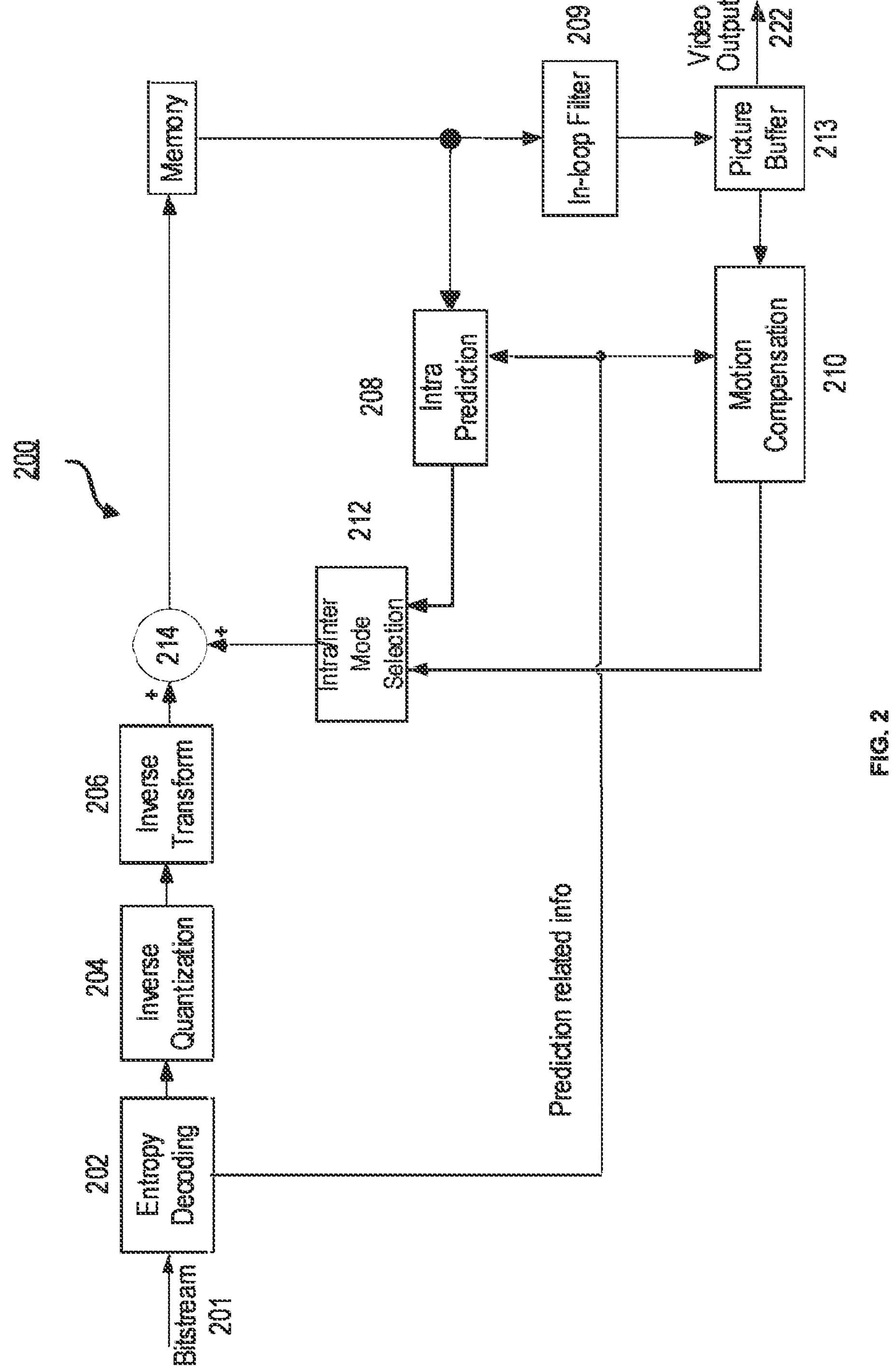
FIG. 2 is a block diagram illustrating a block-based video decoder in accordance with some implementations of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

When neural networks are utilized in a video coding system, the neural network models may be offline or online trained. In the present disclosure, methods and apparatus of a hybrid training framework are described in which both online and offline training methods are used to improve the video coding efficiency. For easier illustration, the present disclosure takes in-loop filtering as an example, while the proposed ideas may be extended to other functioning parts of a video coding system as well. For example, prediction mode decision or transform in FIG. 1. The proposed hybrid training methods may be applied to the traditional block-based video coding system or end-to-end neural network-based video coding systems.

The neural network techniques, e.g., fully connected neural network (FC-NN), convolutional neural network (CNN), and long short-term memory network (LSTM), have already achieved significant success in many research domains, including computer vision and video understanding.

Fully-Connected Neural Network (FC-NN)

Figure 4:
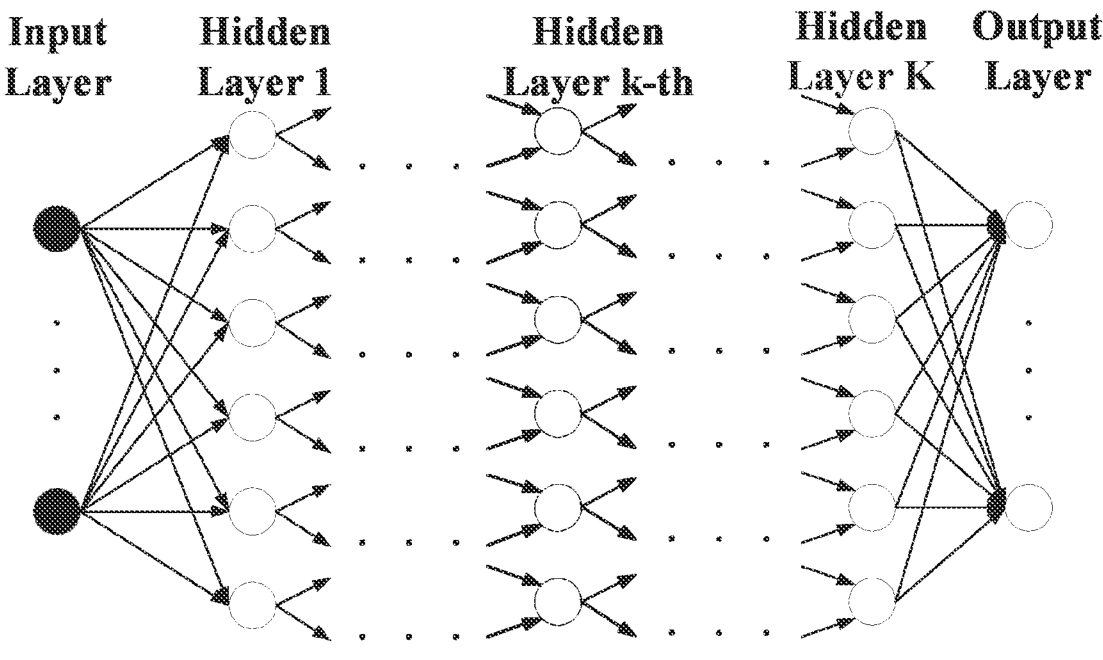
FIG. 4 illustrates a simple FC-NN consisting of input layer, output layer, and multiple hidden layers in accordance with some implementations of the present disclosure.

FIG. 4 illustrates a simple FC-NN consisting of input layer, output layer, and multiple hidden layers in accordance with some implementations of the present disclosure. At k-th layer, the output $f^k(x^{k-1},W^k,B^k)$, is generated by $$f^k(x^{k-1}, W^k, B^k) = \delta(x^{k-1} * W^k + B^k) \tag{1}$$

$$x^{k-1} * W^k + B^k = [x_1^{k-1}, \ldots, x_j^{k-1}, \ldots, x_M^{k-1}] \cdot \begin{bmatrix} W_{1,1}^k & \ldots & W_{0,N}^k \\ \vdots & \ddots & \vdots \\ W_{M,1}^k & \ldots & W_{M,N}^k \end{bmatrix} + [B_1^{k-1}, \ldots, B_j^{k-1}, \ldots, B_M^{k-1}] \tag{2}$$

where $x^{k-1} \in R^M$ is the output of (k−1)-th layer, $W^k \in R^{M*N}$ and $B^k \in R^N$ are the weight and the bias at k-th layer. $\delta(\bullet)$ is the activation function, e.g., the Rectified Linear Unit (ReLU) function as defined in Eq. (3).

$$\delta(x) = \begin{cases} 0, & x < 0 \\ x, & x \ge 0 \end{cases} \tag{3}$$

Therefore, the general form of a K-layer FC-NN is written as $$FCNN(x) = f^K(\dots f^k(f^{k-1}(\dots f^1(x, W^1, B^1)\dots), W^K, B^K)\dots, W^K, B^K), \text{ for } 1 \le k \le K \tag{4}$$

According to the universal approximation hypothesizes and Eq. (4), given any continuous function g(x) and some ε>0, there exists a neural network f(x) with a reasonable choice of non-linearity e.g., ReLU, such that ∀x, |g(x)−f(x)|<ε. Therefore, many empirical studies applied neural network as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Convolutional Neural Network (CNN)

Figure 5A:
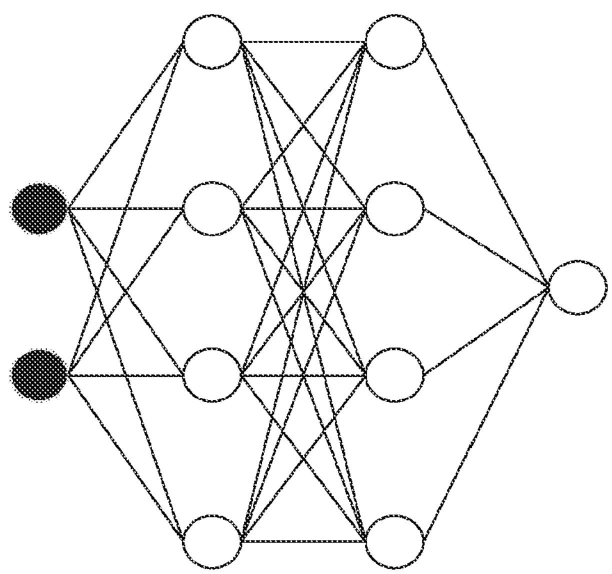
FIG. 5A illustrates an FC-NN with two hidden layers in accordance with some implementations of the present disclosure.
Figure 5B:
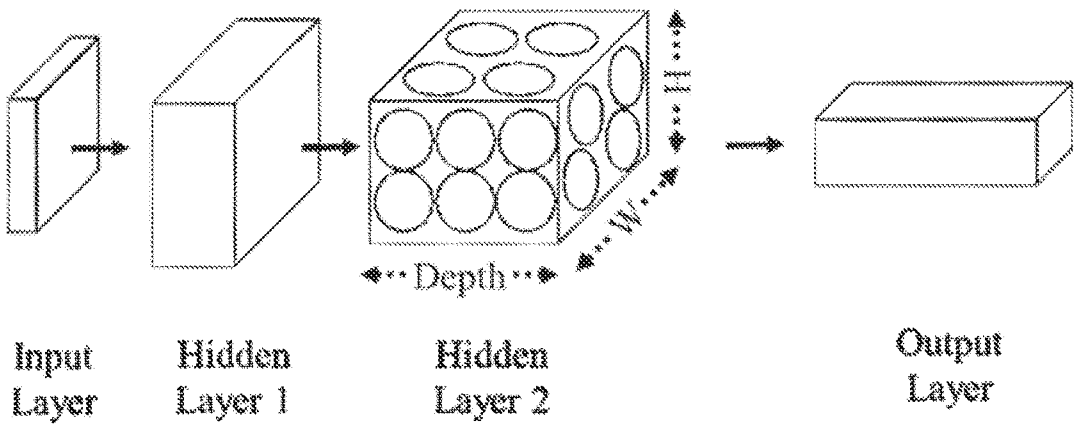
FIG. 5B illustrates an example of CNN in which the dimension of the second hidden layer is [W, H, Depth] in accordance with some implementations of the present disclosure.

FIG. 5A illustrates an FC-NN with two hidden layers in accordance with some implementations of the present disclosure. CNN, a popular neural network architecture for image or video applications, is very similar to the FC-NN as shown in FIG. 5A, which includes weights and bias metrices. A CNN can be seen as a 3-D version of neural network. FIG. 5B illustrates an example of CNN in which the dimension of the second hidden layer is [W, H, Depth] in accordance with some implementations of the present disclosure. In FIG. 5B, neurons are arranged in 3-Dimensional structure (width, height, and depth) to form a CNN, and the second hidden layer is visualized. In this example, the input layer holds input image or video frames therefore its width and height are same as input data. To apply with image or video applications, each neuron in CNN is a spatial filter element with extended depth aligned with its input, e.g., the depth is 3 if there are 3 color components in input images.

Figure 6:
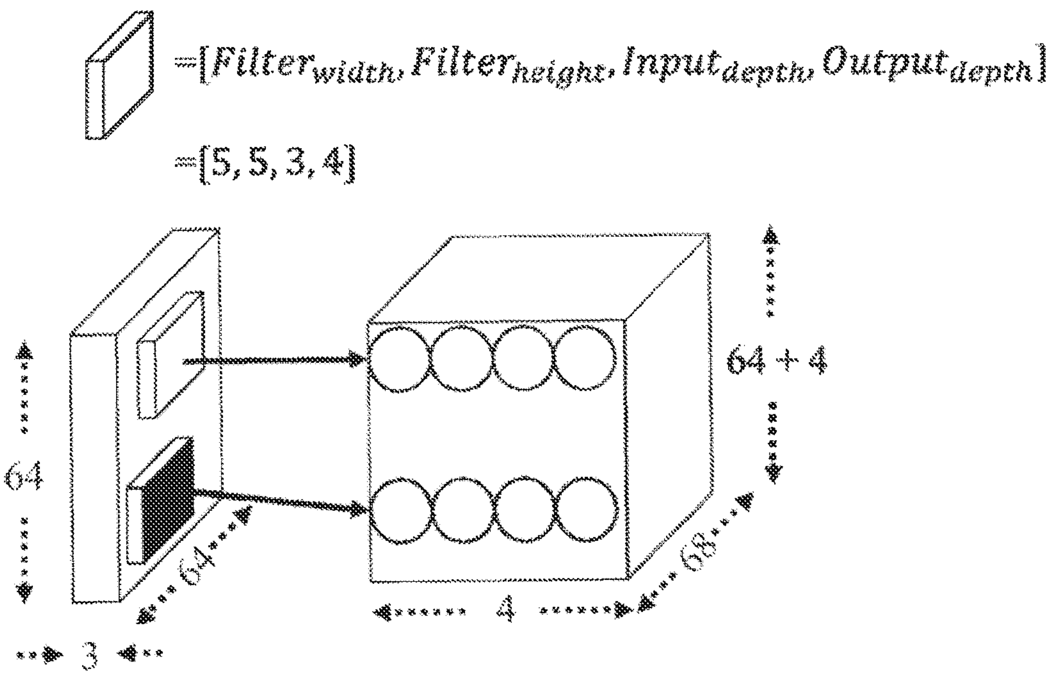
FIG. 6 illustrates an example of applying spatial filters with an input image in accordance with some implementations of the present disclosure.

FIG. 6 illustrates an example of applying spatial filters with an input image in accordance with some implementations of the present disclosure. As shown in FIG. 6, the dimension of basic element in CNN is defined as [$\text{Filter}_{width}$, $\text{Filter}_{height}$, $\text{Input}_{depth}$, $\text{Output}_{depth}$] and set to [5, 5, 3, 4] in this example. Each spatial filter performs 2-dimensional spatial convolution with 5*5*3 weights on an input image. The input image may be a 64×64×3 image. Then, 4 convolutional results are outputted. Therefore, the dimension of filtered results is [64+4, 64+4, 4] if padding the boundary with additional 2 pixels.

Residual Network (ResNet)

In image classification, the accuracy is saturated and degrades rapidly when the depth of neural network increases. To be more specifically, adding more layers on deep neural network results in higher training error because the gradient is gradually vanishing along the deep network and toward to zero gradient at the end. Then, the ResNet composed of residual blocks comes to resolve the degradation problem by introducing the identity connection.

Figures 7A, 7B:
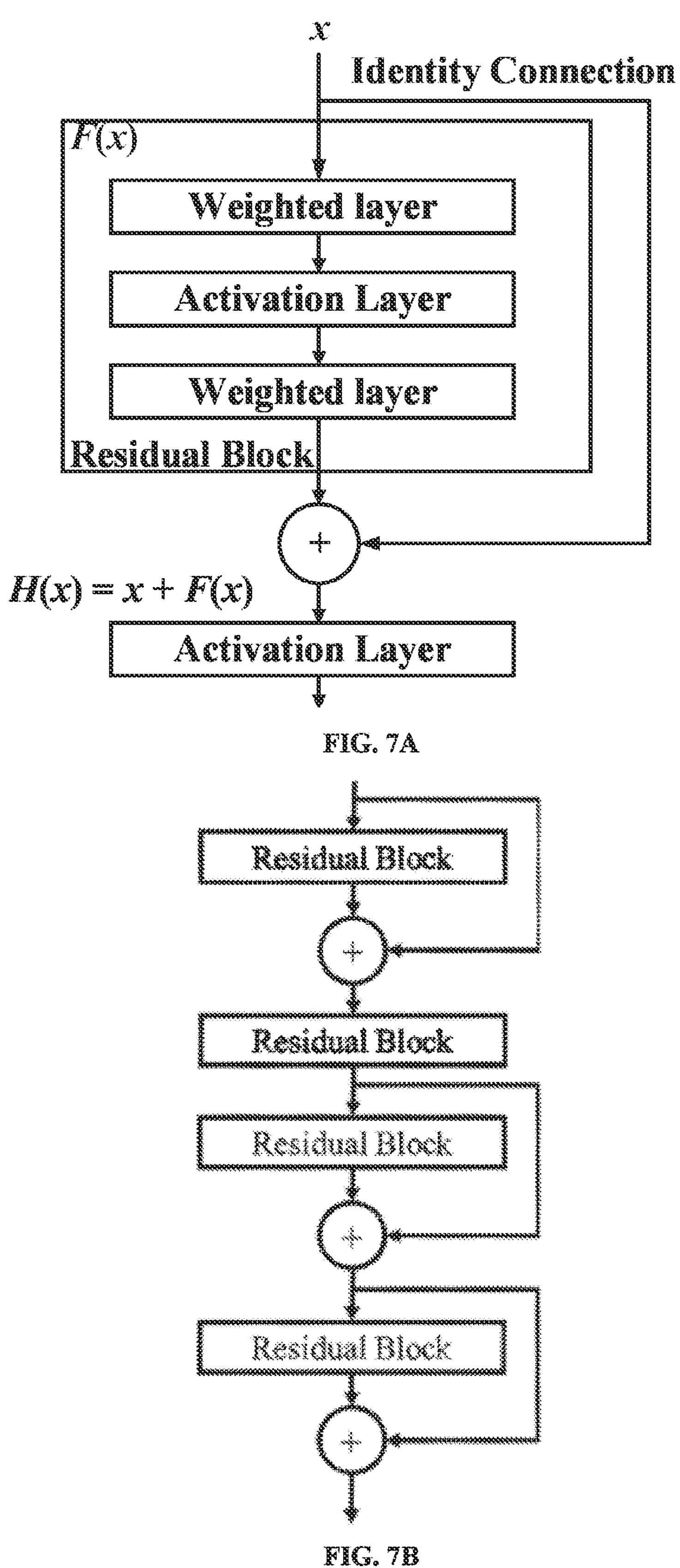
FIG. 7A illustrates a single image super-resolution (ResNet) including a residual block as the element of ResNet that is elementwise added with its input by identity connection in accordance with some implementations of the present disclosure.
FIG. 7B illustrates an example of ResNet by staking residual modules in accordance with some implementations of the present disclosure.

FIG. 7A illustrates a ResNet including a residual block as the element of ResNet that is elementwise added with its input by identity connection in accordance with some implementations of the present disclosure. As shown in FIG. 7A, a basic module of ResNet is consist of the residual block and the identity connection. According to the universal approximation hypothesizes, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing neither additional parameters and computational complexity, the identity connection is proven to make deep learning network trainable by skip one or more non-linear weighted layers as shown in FIG. 7A. Skipping weighted layers, the differential output of the residual layers can be written as $$\frac{\partial H(x)}{\partial x} = \frac{\partial F(x)}{\partial x} + 1 \tag{5}$$

Therefore, even if the differential term $$\frac{\partial F(x)}{\partial x}$$

is gradually decreasing toward zero, the identity term can still carry on and pass the input to next layer instead of stuck at zero gradient as well as blocking information propagation. If a neuron cannot propagate information to next neuron, it is seen as dead neuron, which is non-trainable element in neural network. After addition, another non-linear activation function can be applied as well. FIG. 7B illustrates an example of ResNet by staking residual modules in accordance with some implementations of the present disclosure. As shown in FIG. 7B, the residual features are fused with the identity features before propagating to the next module.

For better generalization, offline trained neural networks may include multiple layers and are iteratively updated during the training stage. The relatively large number of layers may lead to a big parameter size such that excessive processing delay and memory consumption could be observed at the inference stage. In addition, the offline trained neural network models are learned from a given data set, which may not reflect actual data characteristics, e.g., illumination, texture, object deformations, etc., when the models are applied elsewhere.

On the other hand, online trained neural networks adapt well to real application scenarios, but may be constrained with a smaller parameter size, leading to a limited utilization of the non-linear representation ability of a neural network.

For video coding systems, the ground truth, e.g., uncompressed video data, is always accessible at the encoder side, which makes online training viable. In order to explore the combined benefits, a hybrid training framework including both online and offline training are disclosed.

Hybrid Training Framework

In the present disclosure, a hybrid training framework is proposed to improve the coding efficiency of the neural networks utilized for a video coding system. The proposed hybrid training framework may include any combination of below features.

In some examples, one or multiple neural networks with the same or different network architecture may be offline trained first. The data sets selected for the offline training may include different data characteristics, e.g., still images with various background textures, videos with low-motion objects, etc., for better generalization purpose.

Then the offline trained models are refined by online training, e.g., online trained for adapting to specific video content. In this online training stage, a small number of layers may be updated only. For the layers not being updated, for example, the gradients of those layers may be forcefully set to zero if the training algorithm is gradient descent based. On a specific neural network framework, the layers not being updated may be set to not trainable, e.g., PyTorch.

In some other examples, in the online training stage, the offline trained models may be treated as feature extractors with or without further refinement, and a new simple neural network with very few layers or weights may be connected after the offline trained models. In the present disclosure, the neural network being offline trained may also be called a first neural network, and the simple neural network may also be called a second neural network.

At different training stages, the same or different learning algorithms may be used. In one or more examples, at the offline training stage, where the speed of convergence is not stringent and generalization is more important, learning algorithms such as stochastic gradient descent (SGD) may be preferably used. On the other hand, at the online training stage, where both the training speed and fast fitting to the training data are critical, fast learning algorithms such as adaptive moment estimation (ADAM) may be favorably used.

In one or more examples, the switch between different algorithms may be performed within the same training stage. For example, at the offline training stage, in the beginning epochs, fast algorithms such as ADAM is used, then the learning algorithm is switched to be SGD when the loss function generates a loss below a predefined threshold value.

In some examples, when learning algorithms are switched either within the same training stage or between different training stage, a suitable starting value of the learning rate parameter may be switched as well. The specific value of the learning rate may be associated with the loss function or the algorithm itself.

For online training-based model refinement, two factors related to temporal scope include temporal frequency and temporal coverage. Temporal frequency determines when the online training-based model refinement is performed.

In one or more examples, the online training may be performed periodically, such as every two seconds, every one second, or every N video frames, where N may be a positive integer. In some examples, the online training may be triggered based on event.

In one or more examples, the online training may be triggered by the video encoder behaviors, for example, generation of an IDR (Instantaneous Decoder Refresh) coded picture. Every time a new IDR frame is generated, the subsequent motion predicted video frames may contain totally different level of artifacts, e.g., due to the change of the reference pictures.

In one or more examples, the online training can be triggered by the video encoder configurations, for example, intra period value or frame rate. The encoder configuration may be dynamically changed due to different reasons, such as bit rate control, error concealment, etc. The change of the encoder configuration may be activated by a predefined profile or the lower protocol layers of the operation systems running on the device.

In one or more examples, the online training may be triggered by the video content, for example, scene detection. When the objects, the background of the objects, or the objects and the background of the objects within a video frame is changed, the prediction, partition granularity within a video frame, or the prediction and partition granularity within the video frame is likely to be changed as well. These content changes are the main reasons where the video coding bits, coding distortions, or the video coding bits and coding distortions come from.

In some examples, the online training may be triggered in a manner of a combination of periodic and event triggering. For example, the online training may be performed periodically first and then skipped in response to a triggering event.

Furthermore, temporal coverage determines what training data are used for the model update. Speed of convergence is critical for online training. Training data not only impacts the processing delay but also the training convergence, e.g., highly diverse video data is difficult for the training to converge.

In one or more examples, the coding information such as temporal layer information may be used as reference to select training data. For example, within each group of pictures, one picture from each temporal layer may be selected for online training.

In one or more examples, the video content may be used as reference to select training data. For example, within each online training period, adjacent video frames may likely have high temporal redundancy, which means the objects and background are highly similar. In this case, scene information or regions of interest including both objects and background textures can be extracted at the encoder side, and these extracted small patches instead of the whole pictures can be used as the online training data.

In some examples, information other than video frames are also used as training data, e.g., for multi-frame-based training. For example, the motion information between each selected video frame and the anchor frame, e.g., reference pictures, may be used for training the motion predicted frames. In this case, optical flow map may be generated as the representation of motion information.

At the online training stage, each selected video frame may be split or cropped into small patches before used as online training data. The small patches may be clustered according to certain criteria. In some examples, only the patches classified as the same or different clusters are selected to be online training data.

In some examples, each small patch may be represented by a scale-invariant feature descriptor, e.g., histogram of oriented gradients or a template, e.g., bag of words, based feature vectors. Different patches are clustered by the representation similarities.

In some examples, patches are clustered by different level of distortions.

At the online training stage, the video frames or patches with lower qualities, e.g., quantization parameter is greater than a certain threshold value, may have blurred object boundaries or texture details. Therefore, those data may cause severe training confusions which make the training hard to converge and should not be selected as training data.

For video coding, offline trained neural network models are supposed to work on a variety of diverse video sequences after training thus require good generalization, while online trained neural network models need only fit the video data within a small temporal space, e.g., fits the video frames within an intra period, thus require good overfitting. Due to different requirements, the model training process can be considered in the context of the generalization-overfitting trade-off.

In one or more examples, the balance of the generalization-overfitting trade-off can be controlled by training the network on a sufficient amount of data. This has already been discussed above. For example, offline models are trained on larger and diverse data sets, while online models or model refinement are trained within a constrained temporal scope, spatial scope and quality scope.

In one or more examples, the balance of the generalization-overfitting trade-off can be controlled by changing the network complexity. In one example, the network complexity can be changed by adjusting the network structure. Specifically, the number of trainable model parameters or weights can be flexibly configured. For example, online trained networks may set only a small number of layers to be trainable, while offline trained networks may set a large number of layers or all layers to be trainable. This method can be termed as structural stabilization.

In another example, the network complexity can be changed by adjusting the dynamic range of network parameters. Parameters with small dynamic range are less sensitive to statistical fluctuations in the input training data, thus has better generalization capability. However, if overfitting is desirable, such as the online models, parameters with larger dynamical range are preferable.

In some examples, data type, e.g., integer or floating point, is used to control the dynamical range of network parameters or weight. In some other examples, regularization methods are used to control the dynamical range of network parameters or weight. One typical regularization method is to penalize the model, e.g., loss function, during training process based on the magnitude of the parameters or weights value. This approach is called weight regularization or weight decay.

Figure 8:
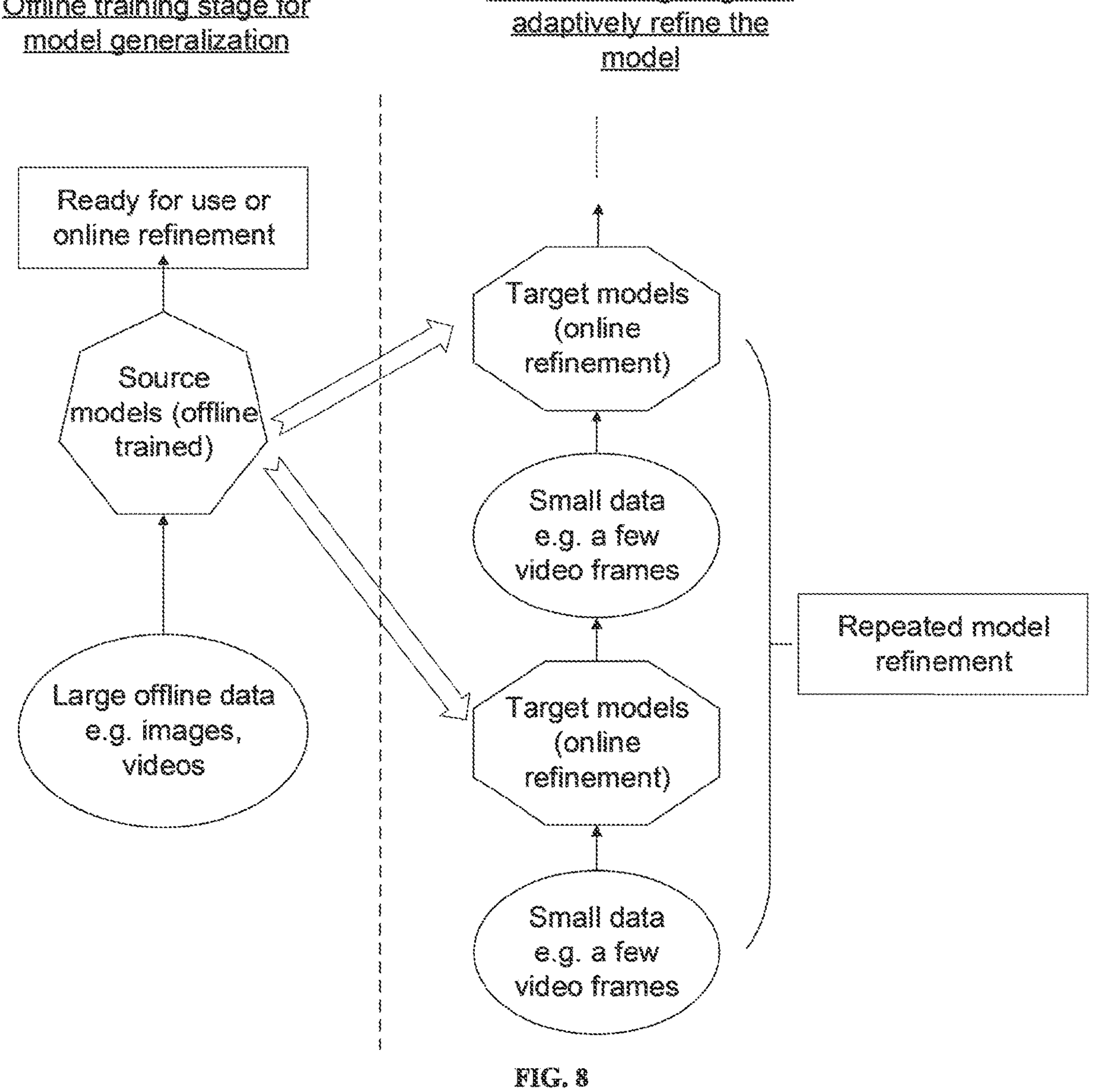
FIG. 8 illustrates a hybrid training framework in accordance with some implementations of the present disclosure.

FIG. 8 illustrates a hybrid training framework in accordance with some implementations of the present disclosure. As shown in the FIG. 8, one or multiple models are first offline trained with large amount of image or video data which have diverse data characteristics, then the models are repeatedly refined by online training with small amount of data. The purpose of the online training is to reduce the network complexity such that the network may better overfit the small amount of data within each refinement period. The network complexity can be reduced by limiting the number of trainable layers, parameters, or weights within the network, or by setting a suitable dynamic range of those trainable parameters or weights.

Figure 9A:
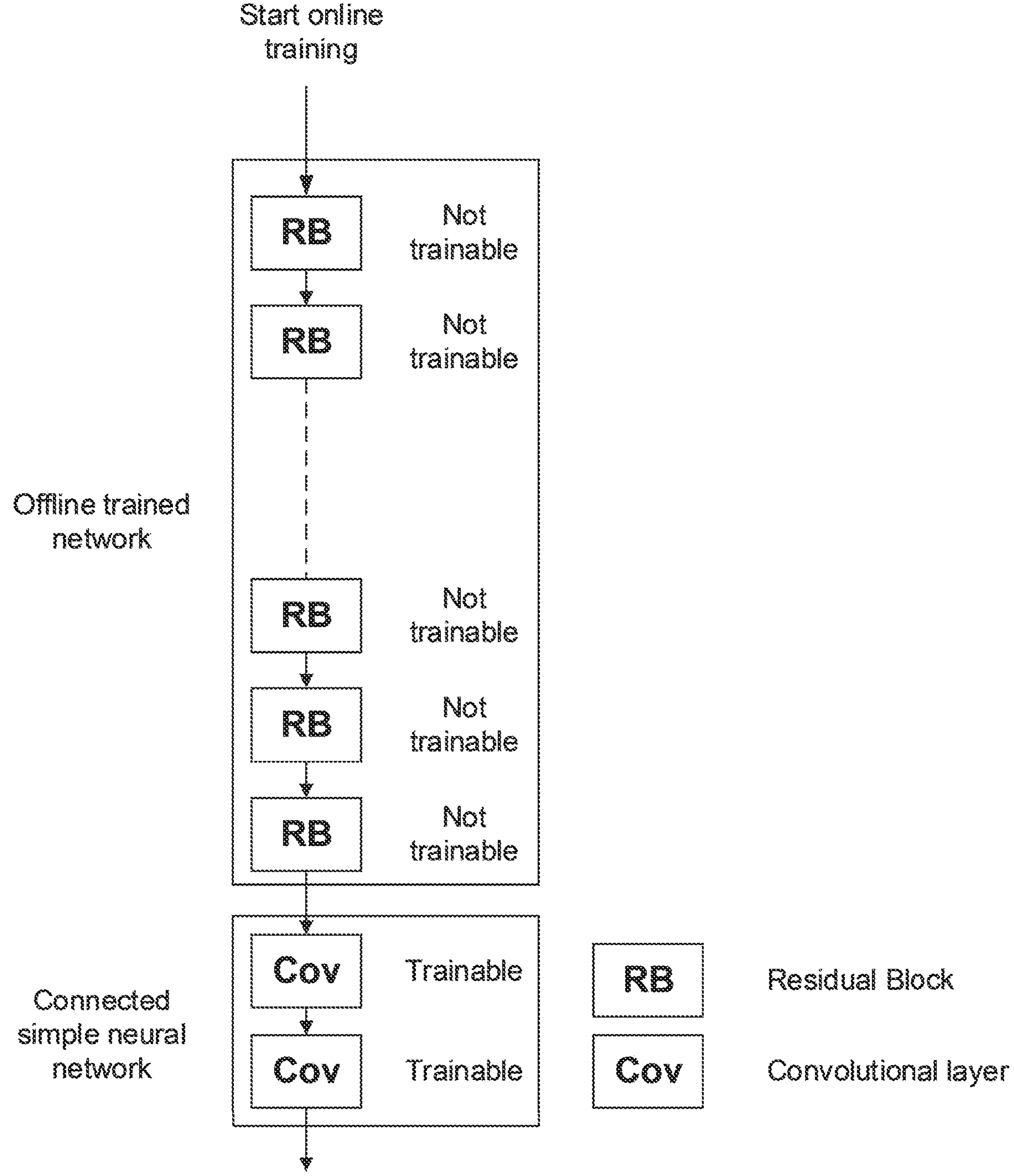
FIG. 9A illustrates an example of online training on an offline trained network and a simple neural network connected to the offline trained network in accordance with some implementations of the present disclosure.
Figure 9B:
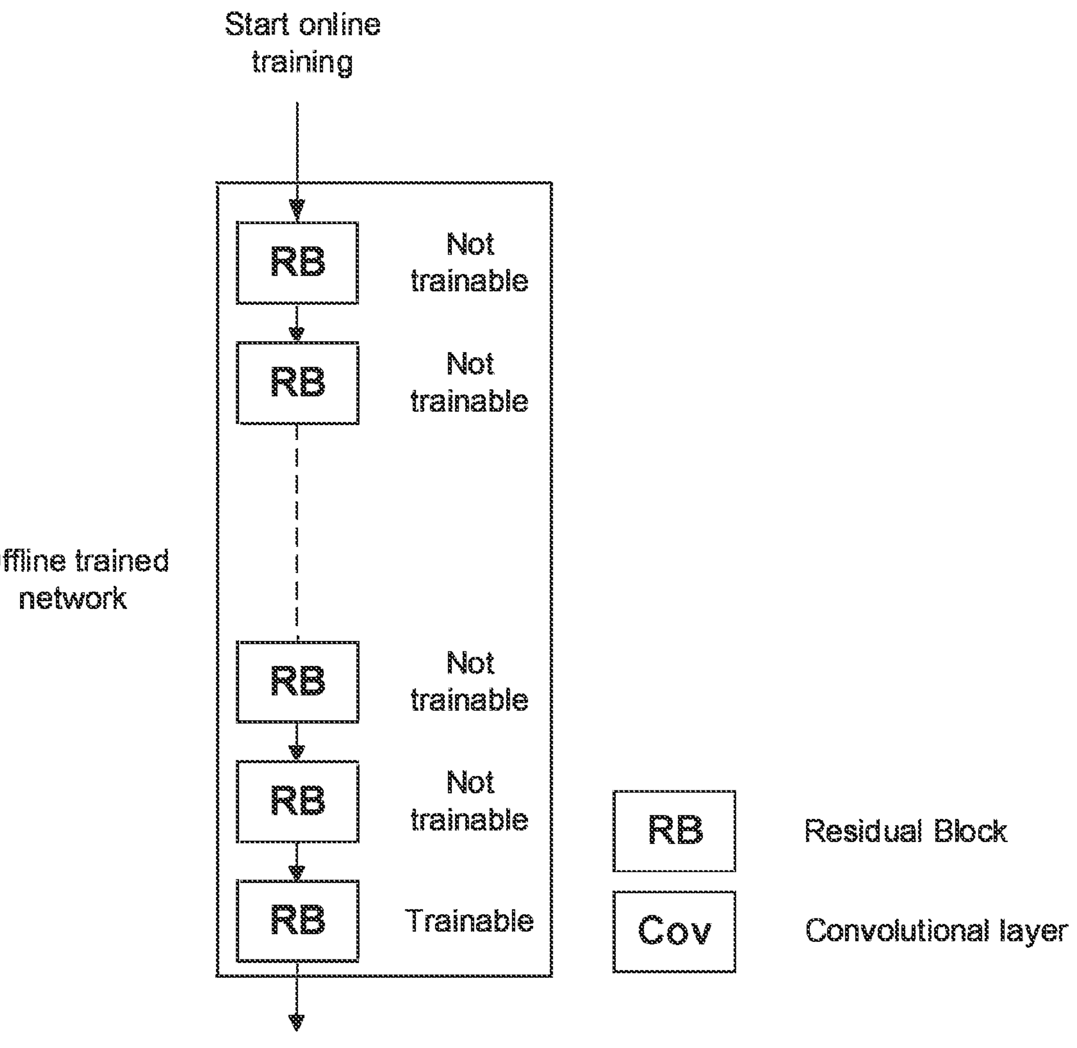
FIG. 9B illustrates an example of online training on an offline trained network in accordance with some implementations of the present disclosure.
Figure 9C:
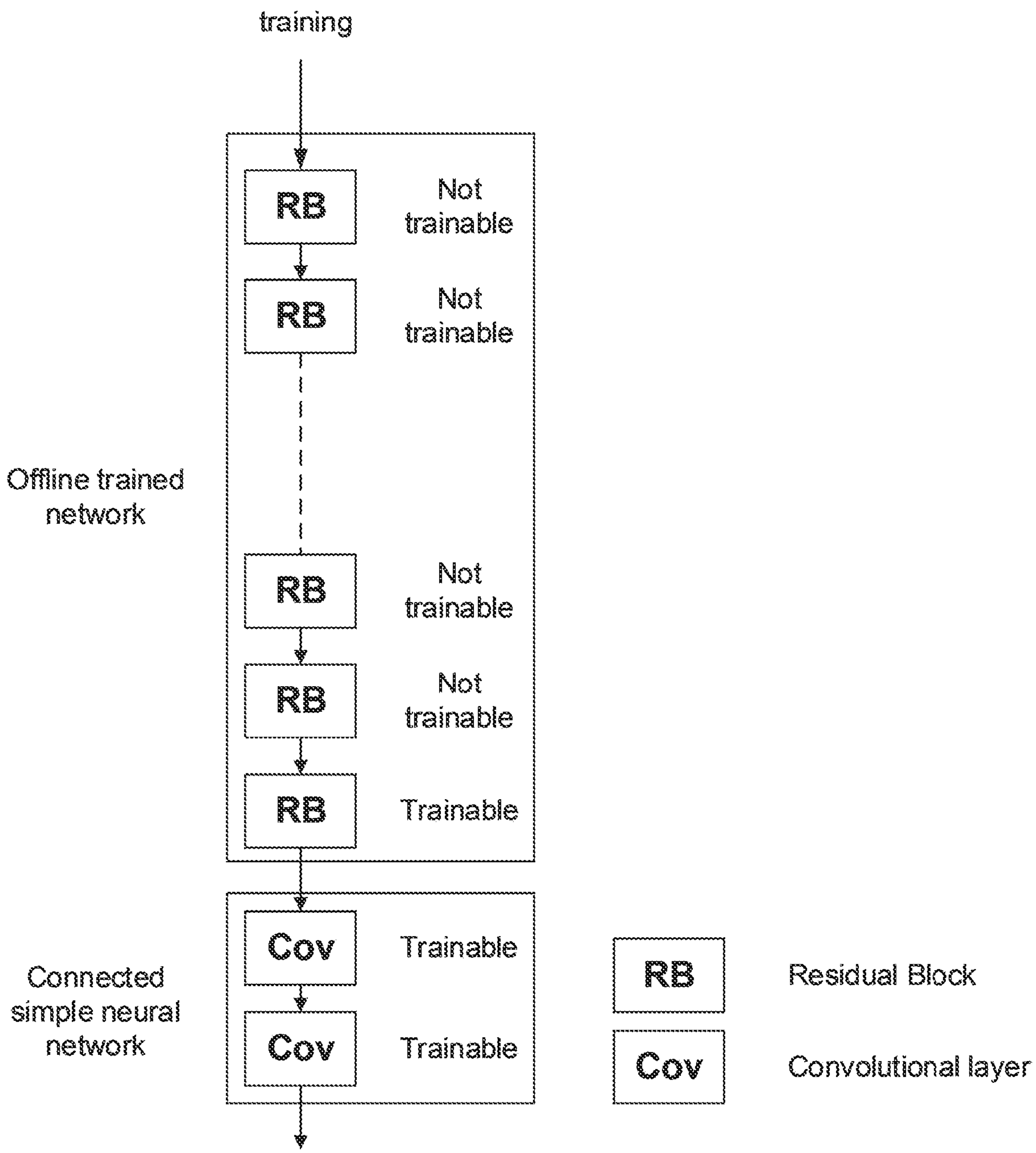
FIG. 9C illustrates an example of online training on an offline trained network and a simple neural network connected to the offline trained network in accordance with some implementations of the present disclosure.

FIGS. 9A-9D illustrate examples on how to perform online training on top of an offline trained network and/or a simple neural network connected to the offline trained network. As shown in the FIGS. 9A-9D, a new simple neural network connected to the offline trained network may be trained at the online training stage as shown in FIG. 9A, or a subset of layers within the offline trained network are refined as shown in FIG. 9B, or both the new simple neural network and a subset of layers within the offline trained network are trained at the online training stage as shown in FIG. 9C.

Transmission of the Online Trained Parameters or Weights

The output after each online training is a limited size of network parameters or weights. To reduce the signaling overhead, the parameters or weights need to be compressed before written into the bitstream.

In one or more examples, even the updated parameters may be large and sensitive to the fluctuations of the input data due to overfitting, parameter pruning and quantization can still be performed. However, in order to maintain the sensitivity, manual setup of the sensitivity is beneficial and doable because the number of layers are typically small.

In one or more examples, instead of directly signaling the updated parameters, mean-shift or weight sharing like methods can be used to as preprocessing step. Also, the difference before and after the parameter update may be derived and constructed as a differential map, which can further reduce the bits to signal the updated parameters.

Interactions with Other Existing In-Loop Filters

If the networks trained for the video codec are used as an in-loop filter, the updated parameters after online training may be used to guide the training of other in-loop filters. For example, for adaptive in-loop filter (ALF), the derived filter coefficients may be extended or tailored to approximate the updated parameters. Once ALF filter coefficients are refined, the updated neural network parameters may not need to be signaled, not only saving bits but also reduce the processing delay due to using the neural network model filtering.

Figure 10:
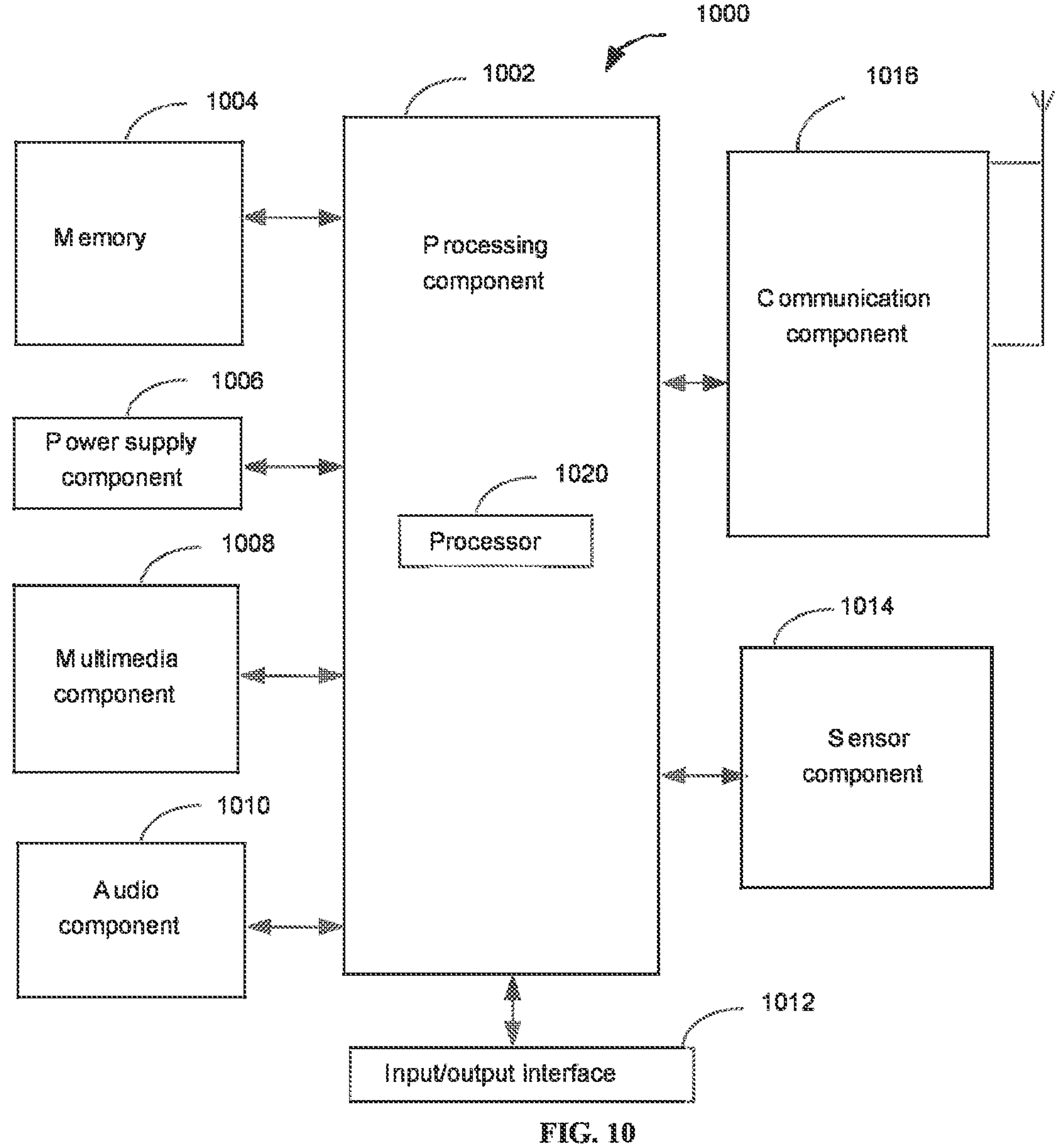
FIG. 10 is a block diagram illustrating an apparatus for hybrid training on neural networks for video coding in accordance with some implementations of the present disclosure.

FIG. 10 is a block diagram illustrating an apparatus for hybrid training on neural networks for video coding in accordance with some implementations of the present disclosure. The apparatus 1000 may be a terminal, such as a mobile phone, a tablet computer, a digital broadcast terminal, a tablet device, or a personal digital assistant.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the apparatus 1000, such as operations relating to display, a telephone call, data communication, a camera operation, and a recording operation. The processing component 1002 may include one or more processors 1020 for executing instructions to complete all or a part of steps of the above method. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the apparatus 1000. Examples of such data include instructions, contact data, phonebook data, messages, pictures, videos, and so on for any application or method that operates on the apparatus 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the apparatus 1000. The power supply component 1006 may include a power supply management system, one or more power supplies, and other components associated with generating, managing and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the apparatus 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the apparatus 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button, and a lock button.

The sensor component 1014 includes one or more sensors for providing a state assessment in different aspects for the apparatus 1000. For example, the sensor component 1014 may detect an on/off state of the apparatus 1000 and relative locations of components. For example, the components are a display and a keypad of the apparatus 1000. The sensor component 1014 may also detect a position change of the apparatus 1000 or a component of the apparatus 1000, presence or absence of a contact of a user on the apparatus 1000, an orientation or acceleration/deceleration of the apparatus 1000, and a temperature change of apparatus 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

Figures 11, 12:
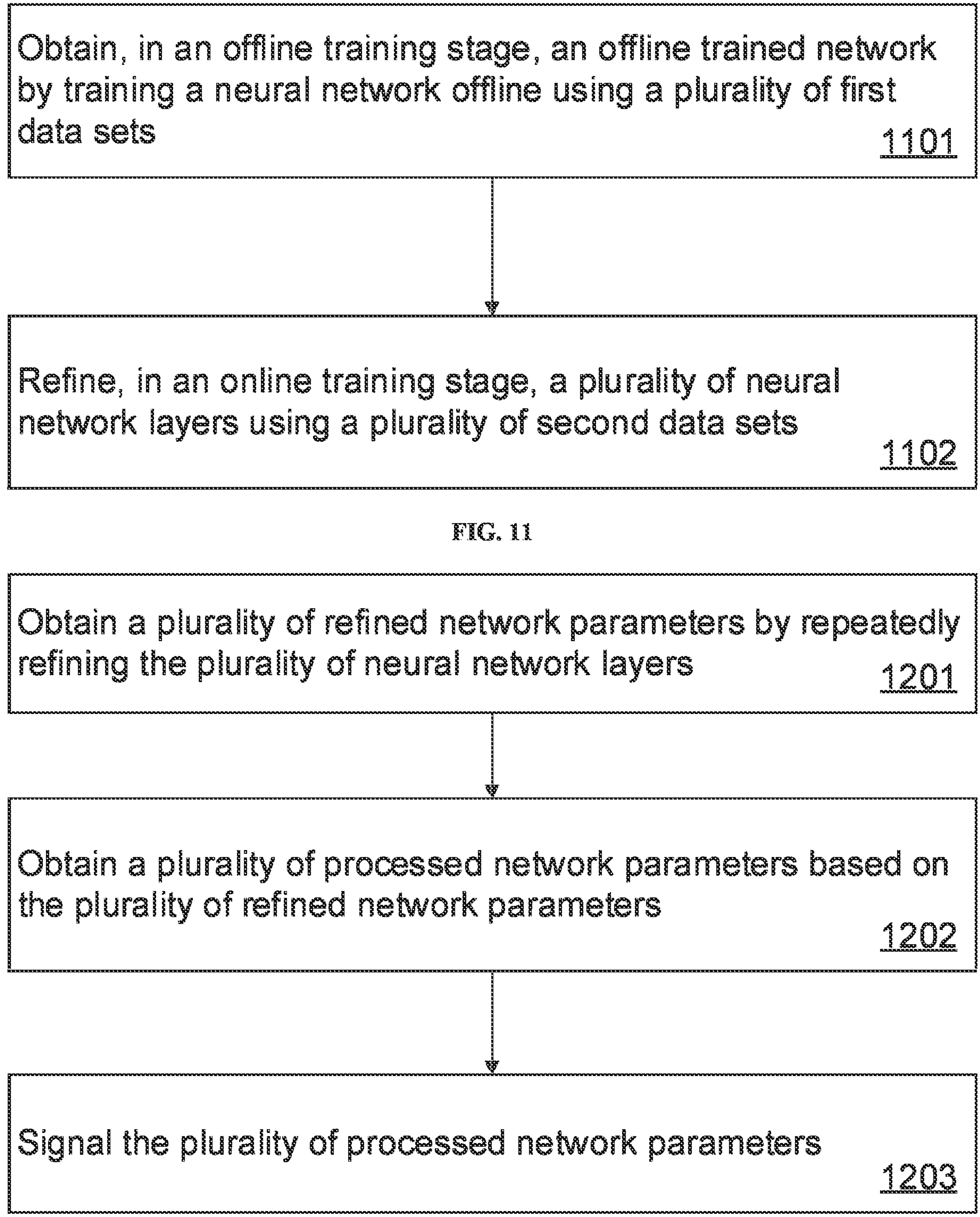
FIG. 11 is a flowchart illustrating a process for hybrid training on neural networks for video coding in accordance with some implementations of the present disclosure.
FIG. 12 is a flowchart illustrating a process for hybrid training on neural networks for video coding in accordance with some implementations of the present disclosure.

FIG. 11 is a flowchart illustrating a process for hybrid training on neural networks for video coding in accordance with some implementations of the present disclosure.

In step 1101, the processor 1020 obtains, in an offline training stage, an offline trained network by training a neural network offline using a plurality of first data sets. As shown in FIG. 8, the plurality of first data sets may include large offline data, e.g., images, videos. The neural network trained offline is also called a first neural network.

In some examples, the plurality of first data sets may include data sets including different characteristics for better generalization purpose, e.g., still images with various background textures, videos with low-motion objects, etc.

In step 1102, the processor 1020 refines, in an online training stage, a plurality of neural network layers using a plurality of second data sets.

Figure 9D:
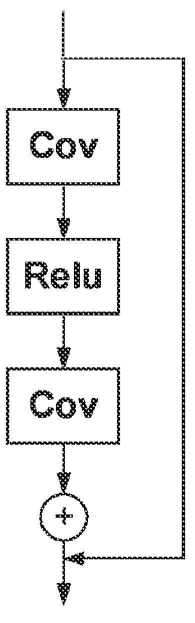
FIG. 9D illustrates an example of a residual block included in an offline trained network in accordance with some implementations of the present disclosure.

In some examples, the plurality of neural network layers may include at least one neural network layer in the offline trained network or in a simple neural network connected to the offline trained network, as shown in FIGS. 9A-9C. The simple neural network is also called a second neural network. As shown in FIG. 9A, the offline trained network or model includes multiple residual blocks (RBs). Each RB may have the same structure as shown in FIG. 9D. As shown in FIG. 9D, the RB include two convolutional layers and a Rectified Linear Unit (Relu) layer that is sandwiched between the two convolutional layers. A simple neural network that is connected to the offline trained network may include, but not limited to, two convolutional layers. Online training may be performed on: only the two convolutional layers in the simple neural network (FIG. 9A), only the last RB in the offline trained network (FIG. 9B), or the last RB in the offline trained network and the two convolutional layers in the simple neural network (FIG. 9C). The number of neural network layers of the second neural network is less than the number of neural network layers of the first neural network.

In some examples, the processor 1020 repeatedly refines the plurality of neural network layers using the plurality of second data sets.

In some examples, the offline trained network may include more neural network layers than the plurality of neural network layers that are refined, as shown in FIGS. 9A-9C.

In some examples, the simple neural network may include less neural network layers than the offline trained network.

In some examples, the processor 1020 may further perform different learning algorithms in a same training stage or different training stages or apply different starting values of a learning rate parameter in a learning algorithm in a same training stage or different training stages. For example, both an SGD algorithm and an ADAM algorithm may perform in the offline training stage or in the online training stage. In some examples, the SGD algorithm may be performed in the offline training stage and the ADAM algorithm may be performed in the online training stage.

In some examples, the processor 1020 may switch from the ADAM algorithm to the SGD algorithm in the offline training stage in response to determining that a loss generated by a loss function is less than a predefined threshold value.

In some examples, the plurality of neural network layers may be refined based on at least one of following manners:

periodically or in response to a triggering event. Further, the triggering event may include one of following events: generating an IDR coded picture; a change of a video encoder configuration; or a change of video content, where the video content may include an object and/or background of an object within a video frame.

In some examples, the plurality of second data sets may include coding information, video content, and/or information other than video frames, where the coding information may include temporal layer information, the video content may include a plurality of patches extracted based on regions of interest from a video frame, and the information other than video frames may include motion information.

In some examples, the plurality of patches may be selected from patches belonging to a same cluster or patches belonging to different clusters, where different patches that are cropped from a video frame correspond to different clusters based on representation similarities or levels of distortion.

In some examples, the plurality of second data sets may include video frames or patches with low qualities. For example, the video frames or patches with low qualities may have qualities that are less than a predetermined threshold. In an example, the predetermined threshold is corresponding to a quantization parameter (QP) equal to 32.

In some examples, the plurality of first data sets may include more data than the plurality of second data sets. The plurality of second data sets may be small amount of data as shown in FIG. 8, e.g., a few video frames.

In some examples, the processor 1020 repeatedly refines the plurality of neural network layers by controlling a trainable structure of network parameters by configuring a sub-set of the network parameters to be trainable.

In some examples, the processor 1020 repeatedly refines the plurality of neural network layers by controlling data types of the network parameters.

In some examples, the processor 1020 repeatedly refines the plurality of neural network layers by controlling network parameters of the plurality of neural network layers using weight regularization.

FIG. 12 is a flowchart illustrating a process for hybrid training on neural networks for video coding in accordance with some implementations of the present disclosure.

In step 1201, the processor 1020 obtains a plurality of refined network parameters by repeatedly refining the plurality of neural network layers.

In step 1202, the processor 1020 obtains a plurality of processed network parameters based on the plurality of refined network parameters.

In some examples, the processor 1020 obtains the plurality of processed network parameters based on the plurality of refined network parameters by pruning or quantizing the plurality of refined network parameters, or processing the plurality of refined network parameters using mean-shift or weight sharing.

In step 1203, the processor 1020 signals the plurality of processed network parameters.

FIG. 13 is a flowchart illustrating a process for hybrid training on neural networks for video coding in accordance with some implementations of the present disclosure.

In step 1301, the processor 1020 obtains a plurality of refined network parameters by repeatedly refining the plurality of neural network layers.

In step 1302, the processor 1020 obtains a difference between original network parameters of the plurality of neural network layers and the plurality of refined network parameters.

In step 1303, the processor 1020 constructs a differential map based on the difference. In some examples, an encoder may send the differential map to a decoder, instead of directly or indirectly signalling the plurality of processed network parameters.

FIG. 14 is a flowchart illustrating a process for hybrid training on neural networks for video coding in accordance with some implementations of the present disclosure.

In step 1401, the processor 1020 obtains a plurality of refined network parameters by repeatedly refining the plurality of neural network layers.

In step 1402, the processor 1020 extends or tailors filter coefficients of an ALF in an encoder to approximate the plurality of refined network parameters.

In some other examples, there is provided a non-transitory computer readable storage medium 1004, having instructions stored therein. When the instructions are executed by one or more processors 1020, the instructions cause the processor to perform any method as described in FIGS. 11-14 and above. In one example, the instructions may be executed by the processor 1020 in the apparatus 1000 to perform the method described above during encoding process to encode video information (for example, video blocks representing video frames, and/or associated one or more syntax elements, etc.) and the online trained parameters or weights into a bitstream or data stream, and may also be executed by the processor 1020 in the apparatus 1000 to transmit the bitstream or data stream (for example, to the video decoder 200 in FIG. 2). Alternatively, the non-transitory computer-readable storage medium may have stored therein a bitstream or a data stream comprising encoded video information (for example, video blocks representing encoded video frames, and/or associated one or more syntax elements etc.) and the online trained parameters or weights generated by an encoder (for example, the video encoder 100 in FIG. 1) using, for example, the method described above during encoding process for use by a decoder (for example, the video decoder 200 in FIG. 2) in decoding video data. The non-transitory computer-readable storage medium may be, for example, a ROM, a Random Access Memory (RAM), a CD-ROM, a magnetic tape, a floppy disc, an optical data storage device or the like.

In some other examples, there is provided a video coding method. The method includes: receiving, at the decoder, a bitstream including encoded video information and online trained parameters, and obtaining the decoded video information by decoding with the bitstream, wherein the online trained parameters in the bitstream are generated through the method for hybrid training of neural networks described above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for hybrid training of neural networks for video coding, comprising:

obtaining, in an offline training stage, an offline trained network by training a first neural network offline using a plurality of first data sets; and refining, in an online training stage, a plurality of neural network layers using a plurality of second data sets, wherein the plurality of neural network layers comprise at least one neural network layer in the offline trained network or in a second neural network connected to the offline trained network, wherein the plurality of second data sets comprise coding information, video content, and/or information other than video frames, the coding information comprises temporal layer information, the video content comprises a plurality of patches extracted based on regions of interest from a video frame, and the information other than video frames comprises motion information.

2. The method of claim 1, wherein refining the plurality of neural network layers using the plurality of second data sets comprises repeatedly refining the plurality of neural network layers using the plurality of second data sets.

3. The method of claim 1, wherein the offline trained network comprises more neural network layers than the plurality of neural network layers that are refined.

4. The method of claim 1, wherein the offline trained network comprises a plurality of residual blocks, the plurality of neural network layers that are refined comprise a last residual block in the offline trained network.

5. The method of claim 1, wherein a number of neural network layers of the second neural network is less than a number of neural network layers of the offline trained network.

6. The method of claim 1, wherein the second neural network comprises at least one convolutional layers and, and the plurality of neural network layers that are refined comprise the at least one convolutional layers in the second neural network.

7. The method of claim 1, further comprising:

performing different learning algorithms in a same training stage or different training stages, wherein the training stage is the offline training stage or the online training stage; or applying different starting values of a learning rate parameter in a learning algorithm in a same training stage or different training stages.

8. The method of claim 7, wherein performing different learning algorithms in different training stages comprises:

performing a stochastic gradient descent (SGD) algorithm in the offline training stage and performing an adaptive moment estimation (ADAM) algorithm in the online training stage.

9. The method of claim 7, wherein performing different learning algorithms in a same training stage comprises:

in response to determining that a loss generated by a loss function is less than a predefined threshold value, switching from an adaptive moment estimation (ADAM) algorithm to a stochastic gradient descent (SGD) algorithm in the offline training stage.

10. The method of claim 1, wherein the plurality of neural network layers are refined based on at least one of following manners: periodically or in response to a triggering event.

11. The method of claim 10, wherein the triggering event comprises one of following events:

a video encoder behavior;

a change of a video encoder configuration; or a change of video content, wherein the video content comprises an object or background of an object within a video frame.

12. The method of claim 1, wherein the plurality of patches are selected from patches belonging to a same cluster or patches belonging to different clusters, wherein different patches that are cropped from a video frame correspond to different clusters based on representation similarities or levels of distortion.

13. The method of claim 1, wherein a data amount of the plurality of first data sets is more than a data amount of the plurality of second data sets.

14. The method of claim 2, wherein repeatedly refining the plurality of neural network layers comprises at least one of following steps:

controlling a trainable structure of network parameters by configuring a sub-set of the network parameters to be trainable;

controlling a dynamical range of network parameters by controlling data types of the network parameters; or controlling network parameters of the plurality of neural network layers using weight regularization.

15. The method of claim 1, further comprising:

obtaining a plurality of refined network parameters by repeatedly refining the plurality of neural network layers;

obtaining a plurality of processed network parameters based on the plurality of refined network parameters by one of following operations:

pruning or quantizing the plurality of refined network parameters; or processing the plurality of refined network parameters using mean-shift or weight sharing; and signaling the plurality of processed network parameters.

16. The method of claim 1, further comprising:

obtaining a plurality of refined network parameters by repeatedly refining the plurality of neural network layers;

obtaining a difference between original network parameters of the plurality of neural network layers and the plurality of refined network parameters; and constructing a differential map based on the difference.

17. The method of claim 1, further comprising:

obtaining a plurality of refined network parameters by repeatedly refining the plurality of neural network layers; and extending or tailoring filter coefficients of an adaptive in-loop filter (ALF) in an encoder to approximate the plurality of refined network parameters.

18. An apparatus for hybrid training of neural networks for video coding, comprising:

one or more processors; and a memory configured to store instructions executable by the one or more processors, wherein the one or more processors, upon execution of the instructions, are configured to perform:

obtaining, in an offline training stage, an offline trained network by training a first neural network offline using a plurality of first data sets; and refining, in an online training stage, a plurality of neural network layers using a plurality of second data sets, wherein the plurality of neural network layers comprise at least one neural network layer in the offline trained network or in a second neural network connected to the offline trained network, wherein the plurality of second data sets comprise coding information, video content, and/or information other than video frames, the coding information comprises temporal layer information, the video content comprises a plurality of patches extracted based on regions of interest from a video frame, and the information other than video frames comprises motion information.

19. A non-transitory computer-readable storage medium storing a bitstream formed by instructions which when executed by a computing device having one or more processors, cause the one or more processors to perform operations comprising:

obtaining, in an offline training stage, an offline trained network by training a first neural network offline using a plurality of first data sets; and refining, in an online training stage, a plurality of neural network layers using a plurality of second data sets, wherein the plurality of neural network layers comprise at least one neural network layer in the offline trained network or in a second neural network connected to the offline trained network, wherein the plurality of second data sets comprise coding information, video content, and/or information other than video frames, the coding information comprises temporal layer information, the video content comprises a plurality of patches extracted based on regions of interest from a video frame, and the information other than video frames comprises motion information.

* * * * *